INVENTOR
JOHN M. BLAKELY

ATTORNEYS

3,530,010
METHOD OF MAKING BLAZED OPTICAL DIFFRACTION GRATINGS

John M. Blakely, Ithaca, N.Y., assignor, by mesne assignments, to Research Corporation, New York, N.Y., a nonprofit corporation of New York
Filed July 22, 1968, Ser. No. 746,652
Int. Cl. C22f 1/02
U.S. Cl. 148—1  5 Claims

ABSTRACT OF THE DISCLOSURE

Blazed optical diffraction gratings are made by forming a single crystal body refracting material having an extended plane surface oriented at an acute angle to a crystallographic plane of the body of low specific surface energy, forming in said extended plane surface a periodic corrugation the grooves of which are parallel to the line of intersection of the low specific surface energy plane with the extended plane surface, and subjecting said body to a subatmospheric pressure at a temperature which is a major fraction of the melting temperature of the material in degrees absolute.

---

This invention relates to novel blazed optical diffraction gratings and to methods of making them.

Heretofore optical gratings having predetermined a predetermined "blaze" or dissymmetry of shape of grooves have been made by means of mechanical ruling machines in which the surface grooves are formed by a shaped diamond.

It has now been found that blazed optical diffraction gratings of high uniformity and stability may be produced by a novel method involving the differential susceptibility of selected crystallographic planes to evaporation when subjected to high temperatures under low pressure.

In general the method of the invention comprises forming a single crystal body of refractory material having an extended plane surface oriented at an acute angle to a crystallographic plane ($hk1$) of the body having low specific surface energy; forming in the extended plane surface a periodic corrugation the grooves of which are parallel (within about 2°) to the line of intersection of the low index crystallographic plane with the extended plane surface; and subjecting the body to a subatmospheric pressure at a temperature which is a major fraction of the melting temperature of the material in degrees absolute.

The body of single crystal material is formed by standard metallographic procedures for the particular material used. The crystallographic plane of low specific surface energy will, in general, be a plane of low Miller indices, for example (111) in face-centered cubic or diamond cubic materials or (110) in body-centered cubic materials.

The conversion of such a body of single crystal material to a blazed diffraction grating will be described more fully with reference to the accompanying drawings in which.

Figure 1:
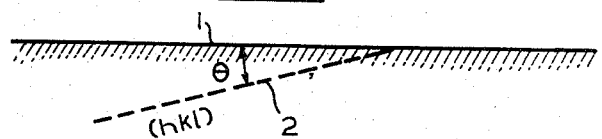
FIG. 1 is a diagrammatic greatly enlarged representation of a portion of a suitably oriented single crystal body.

In FIG. 1, the single crystal portion is oriented with the low index crystallographic plane 2 ($hk1$) oriented at an acute angle ($\theta$) to the optically flat surface 1 of the single crystal body.

Figure 2:
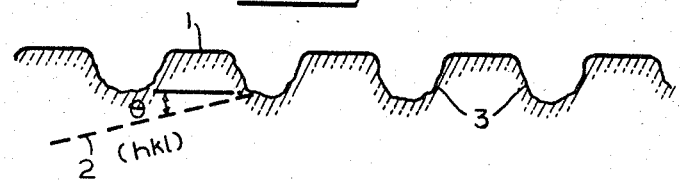
FIG. 2 is a diagrammatic representation of the single crystal body of FIG. 1 in which a periodic corrugation has been formed on the surface thereof.

The periodic corrugation 3 of desired fundamental wavelength shown in FIG. 2 extending parallel to the line of intersection of the low index crystallographic plane with the plane surface 1 of the single crystal body may be formed by mechanical ruling, or by employing a photo-resist and a metallographic etch or polish [Maiya and Blakely: Applied Physics Letters 7.60 (1965)] or the corrugation may be formed by the use of a high intensity pulsed laser. [Gerritsen and Heller: J. Appl. Phys. 38, 2054 (1967)].

Figure 3:
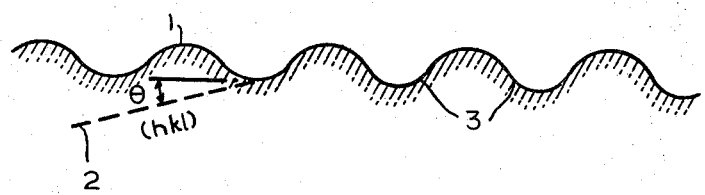
FIG. 3 is diagrammatic representation of an optional step in the method of the invention.

The grooves of the corrugation produced by these techniques are normally of irregular form, as indicated in FIG. 2. They can advantageously be shaped by further electropolishing or etching to an approximately sinusoidal form as shown in FIG. 3.

Figure 4:
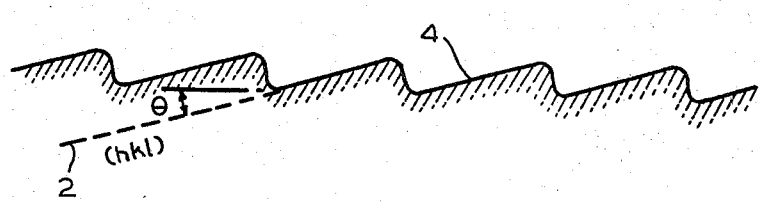
FIG. 4 is a diagrammatic representation of the finished grating surface.

The single crystal body is then annealed in an environment in which the specific free energy of the surface formed by the ($hk1$) plane is significently less than that of the other crystallographic planes included in the surface profile. The surface then develops large optically flat limbs 4 of the corrugation grooves on the ($hk1$) planes forming a blazed diffraction grating as shown in FIG. 4.

The angle $\theta$ may be varied by proper choice of the original surface orientation relative to the low energy plane ($hk1$). The faceted grating surface produced by the method of the invention is energetically stable or metastable and will not change shape appreciably even at temperatures which are a substantial fraction of the melting temperature of the material.

In general, desirable materials for forming the single crystal gratings of the invention are hard materials having relatively high melting points and high reflectivities for the wavelengths with which they will be used. For use with high intensity light sources it is also desirable that the material of the grating body be a good heat conductor. For most purposes, nickel is a very satisfactory material and the following illustrative example relates to the production of the blazed diffraction gratings of the invention from monocrystalline nickel.

A single crystal body of nickel is produced with an optically flat plane surface oriented at angle of $10 \pm 0.5°$ to the (111) crystallographic plane. The plane surface is photoetched by the technique of the Maiya and Blakely paper cited above to form parallel grooves as shown in FIG. 2 parallel to the intercept of the (111) crystallographic plane at a wavelength of 12.4.

After removal of the photoresist the grooved surface is further etched until an aprpoximately sinusoidal shape as shown in FIG. 3 is developed. This surface is then annealed in an oxygen atmosphere at about $10^{-7}$ torr at a temperature of 1219° C. for 8.5 hours, resulting in a blazed grating of the form shown in FIG. 4.

I claim:
1. A method of making blazed optical diffraction gratings which comprises forming a single crystal body of refractory material having an extended plane surface oriented at an acute angle to a crystallographic plane of the body having low specific surface energy, forming in said extended plane surface a periodic corrugation the grooves of which are parallel to the line of intersection of the low specific surface energy plane with said extended plane surface, and subjecting said body to a subatmospheric pressure at a temperature which is a major fraction of the melting temperature of the material in degrees absolute.

2. A method of making blazed optical diffraction gratings as defined in claim 1 wherein the material is nickel.

3. A method of making blazed optical gratings as defined in claim 1 wherein the corrugated body is heated in a low pressure atmosphere of oxygen at a temperature about two-thirds the melting temperature of the material.

4. A method of making blazed diffraction gratings as defined in claim 2 wherein the low specific energy crystallographic plane is the (111) plane.

5. A method of making blazed diffraction gratings as defined in claim 2 wherein the corrugated body is heated in an oxygen atmosphere at about $10^{-7}$ torr at a temperature of about two thirds the melting temperature of nickel.

References Cited

UNITED STATES PATENTS 2,881,104 4/1959 Jones et al. _____ 148—4
3,118,224 1/1964 Becker _____ 148—4

RICHARD O. DEAN, Primary Examiner

U.S. Cl. X.R.

148—4, 13, 20.3; 350—162